Patented Mar. 27, 1928.

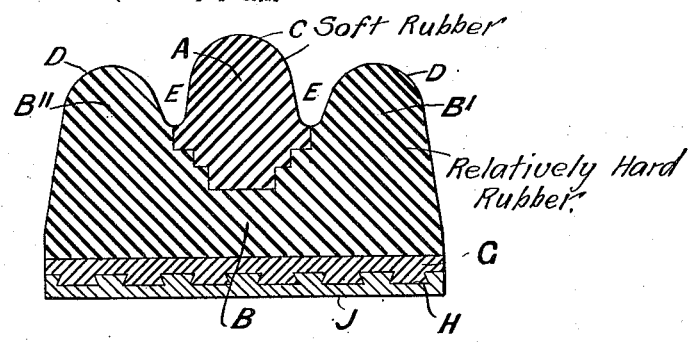
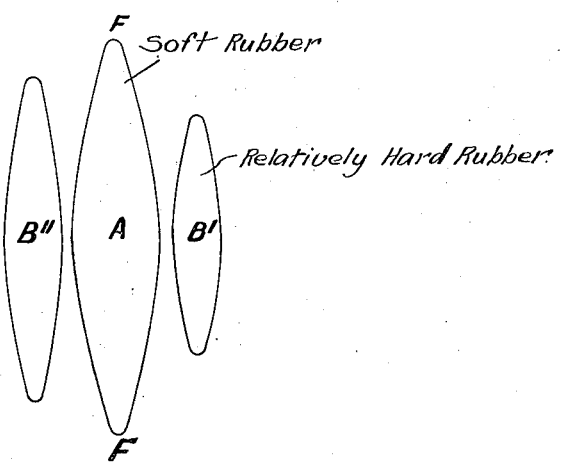
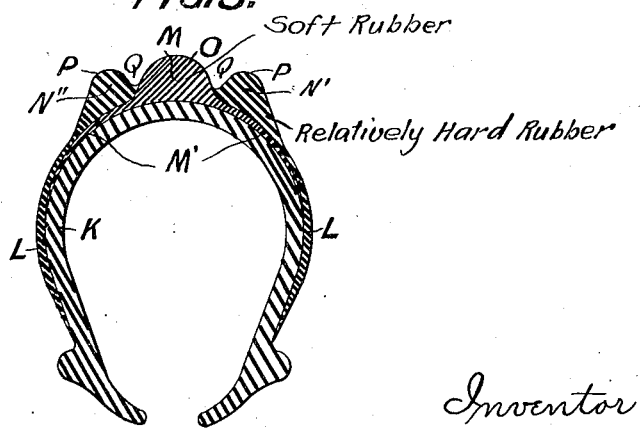

1,664,352

UNITED STATES PATENT OFFICE.

EDWARD WILLIAM COLEMAN, OF SOUTHALL, ENGLAND.

WHEEL TIRE.

Application filed January 22, 1926, Serial No. 83,040, and in Great Britain February 3, 1925.

This invention comprises improvements in wheel tires and such improvements are applicable to resilient tires of the kind comprising a middle tread and side treads spaced laterally from such middle tread.

An important object of this invention is to construct a wheel tire of the kind in question in such a manner that the middle tread is adapted for spewing and spreading under compression due to the load, the said middle tread thereby acquiring a relatively large surface area of contact with the road. A desirable degree of spewing or spreading is that which procures for the middle tread a surface area of contact which is at least twice that of either of the side treads.

A further object is to construct the middle tread element of softer or more resilient material or rubber than that from which the side tread elements are formed and to give the middle tread a greater overall diameter than the side treads. With this construction the middle tread is given a lead in making road contact, and it cannot wear within the peripheries of the side treads. This construction, therefore, not only procures the contact areas aforesaid but also avoids the defect of the middle tread becoming waved or dished and provides a tire which automatically adapts itself to the cambers of the roads.

Yet another object is to construct these tires in such a manner that there is a robust keying and union between the different tread elements, whereby the life of the tire is lengthened and stripping of a tread is impossible.

The spacing of the treads is devised so that it is adequate for shock absorption and so that mud or water displaced by the middle tread is trapped laterally in the spaces between such tread and the side treads. However, the said spaces permit such mud or water to pass in the circumferential direction as will be readily understood.

Generally speaking, therefore, the objects are to provide a resilient wheel tire adapted for reducing shocks and vibration, having desirable anti-splash, non-skid, and non-slip characteristics, and combining resistance to wear and tear, with adaptability for suiting varying road camber.

The drawing, annexed hereto, illustrates suitable practical examples of tire construction embodying these improvements, and in the drawing:—

Figure 1 is a cross section of an improved triple tread solid tire.

Figure 2 is a diagram illustrating the different surface areas of contact between the several treads and the road when the tire is under compression due to the load.

Figure 3 is a cross section of an improved triple tread pneumatic tire.

Referring to Figure 1, A is the middle tread and $B^1$, $B^{11}$ are the side treads of a triple tread solid tire. The middle tread A is of soft red rubber for example, and the side treads $B^1$ $B^{11}$ are of relatively hard rubber. The treads $B^1$ $B^{11}$ may be moulded in one piece with a base part B, the circumferential groove or channel between these treads being given the stepped formation shown in order to produce a robust keying and anchoring of the middle tread A. The overall diameters of the treads are such that the periphery C of the middle tread A stands higher than or lies outside of, the peripheries D of the side treads. The treads are dimensioned laterally so that the intermediate circumferential spaces E are suitable for giving the effect hereinafter described. The base B is moulded on a band of vulcanite G which is formed with interlocks, such as the dovetails H, for keying it on the steel tire band J in known manner.

In the manufacture of this tire, the hard rubber for constituting the base B and side treads $B^1$ $B^{11}$ is applied in plastic form to the vulcanite G on the metal band J and is fashioned to tire form. A suitably shaped tool is then worked around the periphery to produce the stepped groove formation and the soft red rubber is then applied to this stepped groove. The whole is then placed in the mould and cooked or vulcanized in one operation, the finished tire having the formation seen in Figure 1. The different degrees of resilience which the several treads are required to have are determined by the formulas prescribed for the different rubber mixtures.

It will be noted from Figure 1 that the sides of the tire are inclined, a suitable angle of inclination being 10° from the vertical. This inclination is very advantageous in regard to the strength and action of the tire when under load.

Referring to Figure 2, it will be readily understood that, owing to the relative softness or greater resilience of the middle tread A and its greater overall diameter whereby such middle tread A takes a lead over the side tread in making contact with the road, the spewing and spreading of the three treads at the point of compression on the road is unequal. As shown by the diagram, the surface area bounded by the ellipse A and representing the contact area of the tread A under a given load is about double the area bounded by the ellipse $B^{11}$ which represents the area of contact made by the tread $B^{11}$ under that same load and is more than double the area bounded by the ellipse $B^1$ which represents the area of contact made by the side tread $B^1$. In the drawing, it is assumed that the tread $B^1$ is that which runs normally at the gutter side of the road. Owing to the camber of the road and the distribution of the load, the tread $B^1$ suffers less compression than the tread $B^{11}$ with the consequence that there is a minimum tendency for side splashing by the tread $B^1$. According to the direction of travel, the one or the other of the ends F of the ellipse A has a lead over the corresponding ends of the ellipses $B^1$ and $B^{11}$.

With a triple tread tire making the surface areas of contact as above described, it is impossible for the tire to slip on the road surface when making a propulsive effort. Also, side-slip tendency is reduced owing to the large and firm grip made by the middle tread. Furthermore, owing to the relative dimensions and action of the middle tread A, the tire possesses a high degree of resilience which is calculated to minimize shock and vibration.

During revolution of the wheel, mud and water which tends to be propelled laterally by the action of the middle tread, is arrested by the side treads which act as guards, the spacing of the treads being sufficient for enabling the side treads to intercept such mud or water. However, the spaces E permit circumferential passage of mud and water so that there is no resistance to the spreading action of the middle tread at the point of contact with the road.

The keying of the middle tread A is adapted for very strongly resisting lateral stresses or stresses having a lateral component, and it is impossible for the middle tread to be stripped by stresses developed under road running conditions. As the camber of a road varies, the tire automatically adjusts itself to suit the change of camber and preserves the advantageous working conditions hereinbefore described.

As will be readily understood, the soft rubber middle tread A cannot be worn down to within the peripheries of the side treads, and no waving or dishing of the said tread can develop. Thus, the tire is adapted for long life with retention of the advantageous characteristics hereinbefore pointed out.

The pneumatic tire construction in Figure 3 is similar to that described with reference to Figure 1 in regard to the soft rubber middle tread M having a greater overall diameter than the side treads $N^1 N^{11}$ so that its periphery O stands out beyond the peripheries P, and being suitably spaced to produce appropriate circumferential grooves Q. In Figure 3, however, the middle tread M is moulded on to the tube cover or case K with lateral flaps or extensions $M^1$ extending over the peripheral portion of the cover or case K. The side treads $N^1 N^{11}$ of hard rubber are formed each with a lateral extension or flap L extending down a respective side portion of the cover or case K, these treads being bedded on the base portions and extensions $M^1$ of the middle tread and thereby cushioned. The major portion of each flap is vulcanized to the cover or case K. Each one of the three treads is thus given an extensive and strong hold on the case or cover K and while the middle tread M is powerfully keyed and protected against stripping by the superimposition of the side treads as aforesaid, an increased resilience is afforded to the tire by the cushioning of the side treads on the soft rubber, as will be readily understood. All the other advantageous characteristics described with reference to the solid tire construction in Figure 1, are possessed by the pneumatic tire construction in Figure 3.

In the construction of a cord pneumatic tire cover, the soft red rubber is applied to the cord casing so as to produce the middle tread formation and the side flaps or extensions aforesaid. The hard rubber in plastic form is then applied to the respective sides for producing the side tread formations and their flaps or extensions which extend over and beyond the red rubber flaps down the sides of the cord casing. The casing with these rubber formations is then inserted into a mould and subjected to air bag operation for forcing the rubber into the tread rings of the mould in which the tire is vulcanized under pressure of the air bags and finished to the form illustrated by Figure 3. In this latter figure, as in Figure 1, the outer surfaces of the side treads have the advantageous inclination from the vertical plane.

It is to be understood that the invention is not limited to the precise constructions described with reference to the drawing, but that, without departing from the invention defined by the claims, such changes and modifications may be carried out as may be necessary to satisfy the dictates of practical requirements in different circumstances.

I claim:—

1. A resilient wheel tire comprising a combination of individual annular treads of different resilient qualities, namely, a continuous middle tread band constituting an unbroken surface of relatively soft resilient material and continuous side tread bands constituting unbroken surfaces of relatively hard resilient material spaced from said middle band, the latter being of larger overall diameter than the side tread bands and having a base formation presenting extended surfaces to the side tread portions and the said tread bands being vulcanized together over the extended area presented by the base formation of said middle tread band.

2. A resilient wheel tire comprising a base of relatively hard resilient material, a pair of continuous tread bands constituting unbroken surfaces of similar material formed integrally with said base and spaced apart from each other thereon, and an annular tread band constituting an unbroken surface of larger overall diameter than the first mentioned tread bands and made of relatively soft resilient material, this tread band being disposed between the other tread bands and having a base formation with irregular surface engaging similarly formed surfaces of said first-mentioned bands and the whole of said tread bands being vulcanized together on said base over the extended area presented by said irregular base formation.

3. A resilient wheel tire with triple treads comprising two side treads integrally moulded in spaced relation on a solid base portion, the surface of the wall of the intervening space being of stepped formation, and a middle tread of greater diameter than the side treads and of superior resilience, said middle tread being moulded with an extended inner periphery also of stepped formation and vulcanized in the space between the side treads.

EDWARD WILLIAM COLEMAN.